United States Patent
Liao et al.

(10) Patent No.: US 10,876,240 B2
(45) Date of Patent: Dec. 29, 2020

(54) METHOD FOR DECOLORIZATION OF DYED POLYESTER FIBER

(71) Applicant: NAN YA PLASTICS CORPORATION, Taipei (TW)

(72) Inventors: Te-Chao Liao, Taipei (TW); Jung-Jen Chuang, Taipei (TW); Zhi-Ming Huang, Taipei (TW); Zhang-Jian Huang, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 0 days.

(21) Appl. No.: 16/537,483

(22) Filed: Aug. 9, 2019

(65) Prior Publication Data

US 2020/0270790 A1 Aug. 27, 2020

(30) Foreign Application Priority Data

Feb. 22, 2019 (TW) .............................. 108106088 A

(51) Int. Cl.
| | | |
|---|---|---|
| *D06B 5/14* | (2006.01) | |
| *D06B 9/02* | (2006.01) | |
| *D06B 9/06* | (2006.01) | |

(52) U.S. Cl.
CPC ................. *D06B 5/14* (2013.01); *D06B 9/02* (2013.01); *D06B 9/06* (2013.01); *D06B 2700/19* (2013.01)

(58) Field of Classification Search
CPC ... D06B 5/14; D06B 9/02; D06B 9/06; D06B 2700/19
See application file for complete search history.

(56) References Cited

FOREIGN PATENT DOCUMENTS

| | | |
|---|---|---|
| CN | 108203390 A | 6/2018 |
| TW | 201510319 A | 3/2015 |

OTHER PUBLICATIONS 1-methoxy-2-propanol MSDS Jul. 8, 2010.*

* cited by examiner

*Primary Examiner* — Amina S Khan
(74) *Attorney, Agent, or Firm* — Li & Cai Intellectual Property (USA) Office

(57) ABSTRACT

A method for decolorization of a dyed polyester fiber is provided. The method for decolorization of a dyed polyester fiber includes step of: providing an ether-alcohol solvent and a polyester fiber containing a dye; heating the ether-alcohol solvent up to a boiling point of the ether-alcohol solvent to continuingly generate a fresh gas; wherein a temperature of the fresh gas ranges from 90° C. to 200° C. which is between a glass transition temperature of the polyester fiber and a melting point of the polyester fiber; extracting the dye from the polyester fiber via the fresh gas and forming an extracting condensate containing the dye; reflowing the extracting condensate back into the ether-alcohol solvent; repeating the steps mentioned above to obtain a decolorized polyester fiber.

5 Claims, No Drawings

US 10,876,240 B2

METHOD FOR DECOLORIZATION OF DYED POLYESTER FIBER

CROSS-REFERENCE TO RELATED PATENT APPLICATION

This application claims the benefit of priority to Taiwan Patent Application No. 108106088, filed on Feb. 22, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a method for decolorization, and more particularly to a method for decolorization of a dyed polyester fiber.

BACKGROUND OF THE DISCLOSURE

With the rise of environmental awareness, reusing industrial and commercial wastes has now become one of the important issues and has created business opportunities for relevant industries. At present, an annual production of polyester products around the world is about 70 million tons. Among the polyester products, 30% of the polyester products used for bottles can be treated by a well-developed recycling mechanism; however, polyester products used for fibers, being the largest in amount, are still in need of a feasible recycling mechanism. Therefore, how polyester fiber can be viably recycled is currently one of the most important issues.

During the recycling process of the polyester fiber, the decolorization is an important subject. If the polyester fiber is not decolorized completely, the polyester fiber will be difficult to be purified and reused. Accordingly, providing an effective process for decolorization of the polyester fiber is an issue to overcome before establishing the recycling mechanism of the polyester fiber.

According to the disclosures of U.S. Pat. Nos. 5,356,437 and 5,613,983, the dye contained in the polyester fiber is oxidized by an oxidizing agent so that the polyester fiber can be discolored or decolorized. However, the oxidized dye is still attached on the polyester fiber, which will cause troubles in subsequent purifying and recycling processes. Specifically, the disperse dye is a dye commonly used for polyester fiber which contains many diazo groups or halogen groups (such as chloride group or bromo group). In a high-temperature environment, the diazo group and the halogen group tend to induce a series of pyrolysis or other side reactions. Once the byproducts produced through the side reaction are dispersed in the polyester fiber, the purity of the polyester fiber will be decreased and the physical property of the polyester fiber will be deteriorated. Therefore, the following decolorization technology is developed toward removing the dye in the polyester fiber by physical adsorption.

According to the disclosure of U.S. Pat. No. 7,192,988, the dye in the polyester product is adsorbed by active carbon. However, methanol or ethylene glycol has to be firstly added to the polyester product, and then the polyester product can be depolymerized into monomers at 180° C. to 280° C. Subsequently, monomers are treated by the active carbon at a temperature higher than 170° C. Although the dye will not decompose in this method, a series of pyrolysis or side reactions may still be induced due to the high-temperature environment and the existence of catalysts, causing the decrease of adsorbability of active carbon relative to the dye. In addition, active carbon has selectivity toward the dye. Active carbon with different structure of surficial-hole and different functional group has different adsorption tendencies. Another difficulty of this method is that active carbon is hard to be separated from the polyester product. Only by separating the dye adsorbed by the active carbon from the decolorized polyester products, can the decolorized polyester product be obtained.

For recent decolorization technology, the dye in the polyester fiber is removed without any chemical reaction. For example, the dye is extracted from the polyester fiber by the solvent for removing the dye and preventing the decomposition of the dye and the production of byproducts. However, the solvent may pollute the environment and be harmful to the human body, so that how the usage of the solvent can be reduced has become an important subject.

According to disclosure of U.S. Pat. No. 7,959,807, a method for decolorization of the polyester fiber by a non-chlorine solvent is provided. In this method, the polyester fiber is immersed into the non-chlorine solvent and contacts the non-chlorine solvent so that the dye can be extracted. However, when the concentration of the dye in the solvent is saturated, the immersed polyester fiber may be re-dyed. Therefore, the polyester fiber has to be immersed in other unsaturated solvent many times to reach the expected decolorization effect. The large consumption of the solvent in the process will negatively impact the environment. From the aspect of the environmental protection, an eco-friendly and effective method for decolorization of the polyester fiber still needs to be provided.

As mentioned above, the method of extracting the dye from the polyester fiber by solvent can prevent problems induced by the dye and the polyester fiber at high-temperature environment and remove the dye in the polyester fiber. However, in order to reach the expected decolorization effect, the number of times of extraction is high and the consumption of the solvent is large. Therefore, an effective and environment-friendly method for decolorization of the dyed polyester is required.

According to disclosure of Taiwan Patent No. 1481762, a gas generated by heating the solvent including xylene, glycol, dilute ester, and any combination thereof to the boiling point of the solvent is used to extract the dye in the polyester fiber. After the extraction, the gas with the dye is condensed and reflowed to the solvent to reduce the usage of the solvent and to remove the dye effectively. However, the boiling point of the solvent is higher than 138° C., causing the energy cost in this method to be high.

SUMMARY OF THE DISCLOSURE

In response to the above-referenced technical inadequacies, the present disclosure provides an eco-friendly and effective method for decolorization of a dyed polyester fiber. In the method, the manner of extraction is not limited to immersion. Further, the processing temperature in the method is lower than that in conventional method and the method can remove the dye from the polyester fiber effectively.

In one aspect, the present disclosure provides a method for decolorization of a dyed polyester fiber including steps of (a) providing an ether-alcohol solvent and a polyester fiber containing a dye; (b) heating the ether-alcohol solvent up to a boiling point of the ether-alcohol solvent to continuingly generate a fresh gas; wherein a temperature of the fresh gas ranges from 90° C. to 200° C. which is between a glass transition temperature of the polyester fiber and a melting point of the polyester fiber; (c) extracting the dye from the polyester fiber via the fresh gas and forming an extracting condensate containing the dye; (d) reflowing the extracting condensate back into the ether-alcohol solvent; (e) repeating the steps mentioned above to obtain a decolorized polyester fiber.

The method for decolorization of a dyed polyester fiber of the present disclosure can extract the dye completely by generating and condensing the fresh gas to remove the dye in the polyester fiber. Further, the method of the present disclosure can replace the conventional method for decolorization by immersing the polyester fiber in the solvent. The method for decolorization of the present disclosure can recycle and reuse the solvent so as to reduce the usage of solvent, lower the processing temperature, and reduce the processing cost.

These and other aspects of the present disclosure will become apparent from the following description of the embodiment taken in conjunction with the following drawings and their captions, although variations and modifications therein may be affected without departing from the spirit and scope of the novel concepts of the disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure provides a method for decolorization of a dyed polyester fiber including steps of:

(a) providing an ether-alcohol solvent and a polyester fiber containing a dye;

(b) heating the ether-alcohol solvent up to a boiling point of the ether-alcohol solvent to continuingly generate a fresh gas; wherein a temperature of the fresh gas ranges from 90° C. to 200° C. which is between a glass transition temperature of the polyester fiber and a melting point of the polyester fiber;

(c) extracting the dye from the polyester fiber via the fresh gas and forming an extracting condensate containing the dye;

(d) reflowing the extracting condensate back into the ether-alcohol solvent;

(e) repeating the steps (a) to (d) to obtain a decolorized polyester fiber.

Specifically, a color space of the decolorized polyester fiber is defined by $L \geq 80$, $a \leq 0$, and $b \leq 4$.

The dyed polyester fiber is a polyester fiber containing the dye. The material of the polyester fiber can be but not limited to: polyethylene terephthalate fiber (abbreviated as PET fiber, whose Tg is 69° C. to 82° C. and whose Tm is 250° C. to 265° C.), polybutylene terephthalate fiber (abbreviated as PBT fiber, whose Tg is 80° C. and whose Tm is 225° C.), polytrimethylene terephthalate fiber (abbreviated as PTT fiber, whose Tg is 60° C. and whose Tm is 223° C.), polycyclohexylenedimethylene terephthalate fiber (abbreviated as PCT fiber, whose Tg is 92° C. and whose Tm is 258° C.), and poly(ethylene 2,6-naphthalate fiber (abbreviated as PEN fiber, whose Tg is 117° C. and whose Tm is 337° C.). Preferably, the polyester fiber is polyethylene terephthalate fiber. The dye is a common dye suitable for polyester fiber, such as, the disperse dye, the cationic dye, and the fluorescent brightener. Preferably, the polyester fiber further includes additional agents, such as but not limited to various processing agents.

The disperse dye is slightly soluble in the water and the disperse dye can be highly dispersed in the water with the aid of the dispersant. The disperse dye does not have water-soluble groups and has low molecular weight. The disperse dye has polar groups (such as hydroxyl group, amino group, hydroxyalkylamino group, and cyanoamino group) but still belongs to non-ionic dyes. This type of dye needs high-grade post-processing steps, for example, grinding with a dispersant by a grinder to form highly dispersed grains with stable crystal morphology so that it can be used. The solution of the disperse dye is a stable and homogeneous suspension, and can be applied to dye the polyester fiber and the acetate fiber.

The cationic dye is a type of the fiber dye also known as the basic dye. The cationic dye is soluble in the water and can dissociate cation. The cationic dye ionizes in the solution and forms a colored ion with positive charge acting as dye. The cation of the dye can bond to the acidic group of the third monomer of the fiber so as to dye the fiber. The cation of the dye is a specialized dye for the acrylic fiber and has advantages of high strength, bright color, and good light color fastness.

The fluorescent brightener is a fluorescent dye also known as the white dye. The fluorescent brightener is a complicated organic compound. The fluorescent brightener can excite the incident light and emit the fluorescent light so that the material dyed by the fluorescent brightener will sparkle much like fluorite. Accordingly, the material dyed by the fluorescent brightener will appear extremely white to the naked eye.

In step (b), the boiling point (Tb) of the solvent at normal pressure is between the glass transition temperature of the polyester fiber and the melting point of the polyester fiber. Preferably, the boiling point of the solvent is between 90° C. to 200° C. More preferably, the boiling point of the solvent is between 100° C. to 140° C. If the boiling point of the solvent at normal pressure is lower than the glass transition temperature of the polyester fiber, the boiling point of the solvent can be increased to not lower than the glass transition temperature of the polyester fiber by pressurization. Conversely, if the boiling point of the solvent at normal pressure is higher than the glass transition temperature of the polyester fiber, the boiling point of the solvent can be decreased to not higher than the glass transition temperature of the polyester fiber by depressurization.

In the present disclosure, the solvent is heated to its boiling point by the heater. At the boiling point of the solvent, the solvent will continuingly vaporize and generate the fresh gas. As long as the heater can heat the solvent to its boiling point, the type of the heater is not restricted. The heater and the polyester fiber can be disposed in different tanks to be separated from each other. In addition, the fresh gas formed by the heater can be transported into the tank as contained the polyester fiber via an external pipe for decolorization. In the method, the solvent contacts the polyester fiber in a gaseous form rather than contacts the polyester fiber in a liquid form through immersion. From a macroscopic perspective, when the polyester fiber contacts the fresh gas, the polyester fiber will start swelling. From a microscopic perspective, when the polyester fiber contacts the fresh gas, the temperature of the fresh gas will drive the molecule of the polyester fiber to move, which is beneficial to the extraction in step (c).

The ether-alcohol solvent is selected from the group consisting of ethylene glycol monomethyl ether (abbreviated as EM, and whose Tb is 124° C.), diethylene glycol monomethyl ether (abbreviated as DEM, and whose Tb is 194° C.), triethylene glycol monomethyl ether (abbreviated as TEM, and whose Tb is 122° C. at a pressure of 10 mmHg), ethylene glycol monoethyl ether (abbreviated as EE, and whose Tb is 135.6° C.), diethylene glycol monoethyl ether (abbreviated as DE, and whose Tb is 201.9° C.), ethylene glycol monobutyl ether (abbreviated as EB, and whose Tb is 171° C.), ethylene glycol propyl ether (abbreviated as EP, and whose Tb is 151.3° C.), propylene glycol monomethyl ether (abbreviated as PM, and whose Tb is 120° C.), dipropylene glycol monomethyl ether (abbreviated as DPM, and whose Tb is 190° C.), propylene glycol monoethyl ether (abbreviated as PE, and whose Tb is 132.8° C.), dipropylene glycol monoethyl ether (abbreviated as DPE, and whose Tb is 223.5° C.), propylene glycol monobutyl ether (abbreviated as PNB, and whose Tb is 171.1° C.), dipropylene glycol monobutyl ether (abbreviated as DPNB, and whose Tb is 222° C.), propylene glycol propyl ether (abbreviated as PP, and whose Tb is 149° C.), dipropylene glycol propyl ether (abbreviated as DPP, and whose Tb is 243° C.), and any combination thereof. Preferably, the ether-alcohol solvent is selected from at least one in the group consisting of ethylene glycol monomethyl ether, ethylene glycol monoethyl ether, propylene glycol monomethyl ether, and propylene glycol monoethyl ether.

Compared to the conventional operation of immersing the polyester fiber in the solvent, the method for decolorization of the present disclosure extracts the dye in the polyester fiber via the fresh gas vaporized from the solvent. After extraction, the fresh gas with the dye condenses into the extracting condensate and reflows back to the solvent. The solvent in the extracting condensate can be turned into the fresh gas again so as to decolorize the polyester fiber repeatedly. Therefore, different from the decolorization through 2 to 3 times of immersions, the usage of the solvent in the method of the present disclosure can be significantly reduced The manner of separating the extracting condensate containing the dye from the polyester fiber can be any common manner of solid-liquid separation, such as gravitational separation, pressure filtration, nitrogen gas pressure filtration, vacuum suction filtration, or centrifugal separation. Preferably, when the gravitational separation is used to separate the extracting condensate from the polyester fiber, the polyester fiber is separately disposed above the solvent so that the extracting condensate can drop from the polyester fiber into the solvent by gravity.

A reacting region of the method for decolorization of the present disclosure is not limited. The reacting region needs to be capable of restricting the fresh gas from leakage and enduring the temperature of the boiling point of the solvent. The fresh gas is continuingly generated by heating the solvent to the boiling point of the solvent by a heater. As long as the heater can heat the solvent to its boiling point, the type of the heater is not limited. The heater and the polyester fiber can be disposed in different tanks or the same tank. When the heater and the polyester fiber are disposed in different tanks, the fresh gas generated by the heater in a tank can be transported into another tank containing the polyester fiber through an external pipe for decolorization.

[Chemicals and Instruments]

1. XF-19: a diazo-type deep yellow dye with good light color fastness which belongs to a disperse dye and produced by Chung Fu Dyestuffs Co., Ltd.

2. CBN-356: a deep red disperse dye produced by Chung Fu Dyestuffs Co., Ltd.

3. XF-284: a navy blue disperse dye produced by Chung Fu Dyestuffs Co., Ltd.

4. Color-difference meter: model NE4000 supplied by NIPPON DENSHOKU.

Example 1

A polyester fiber (100% polyester fiber with an area of 10×10 $cm^2$ having a glass transition temperature of 69° C. and a melting point of 250° C.) (1.5 grams) dyed by XF-19 is weighed. A heater is disposed on a bottom of a normal-pressure decolorizing tank (1 L) to heat the bottom of the decolorizing tank and a body of the decolorizing tank. Condensing equipment is disposed on a top of the decolorizing tank. Proprylene glycol monomethyl ether (150 g) used as the solvent is added in the decolorizing tank. A metal porous grid is disposed in the decolorizing tank. The polyester fiber dyed by the deep yellow dye is disposed on the metal porous grid to separate the polyester fiber from the solvent by a fixed distance.

The temperature in the decolorizing tank is equal to the boiling point of proprylene glycol monomethyl ether (120° C.) so that proprylene glycol monomethyl ether can be vaporized and the fresh gas (120° C.) can be generated so as to decolorize the polyester fiber for 1 hour. After the polyester fiber is taken out from the decolorizing tank, the polyester fiber is put in a deionized water (25° C.) to remove the excessive solvent on a surface of the polyester fiber, and then the polyester fiber is dried at 100° C. The specific parameters of the dye, the polyester fiber, and the type of solvent are listed in Table 1.

Examples 2 to 6

The dyed polyester fiber in Examples 2 to 6 is decolorized by similar method illustrated in Example 1. The differences are that the solvent used in Examples 4 to 6 are different from proprylene glycol monomethyl ether so as to generate different types of the fresh gas, and the polyester fiber (having a glass transition temperature is 69° C. and a melting point of 250° C.) in Examples 2 and 3 are dyed by different dyes from XF-19. The specific parameters thereof are listed in Table 1.

Comparative Example 1

A white polyester fiber free of the dye is provided.

Comparative Examples 2 and 3

A white polyester fiber free of the dye similar to Comparative Example 1 is also provided, but xylene or ethylene glycol is added in the decolorizing tank acting as solvents.

Comparative Examples 4 and 5

A polyester fiber dyed by a deep yellow dye (1.5 g) is immersed in the solvent to extract the deep yellow dye for decolorization.

The specific parameters of Comparative Examples 1 to 5 are listed in Table 1.

[Optical Test]

An optical test is conducted upon the polyester fiber of Examples 1 to 6 and Comparative Examples 1 to 5 before the decolorization processing and after the decolorization processing.

The color-difference meter is used to measure the color space defined by L×a×b according to JIS Z8729 standard. Higher value of "L" represents the color close to white; higher value of "a" represents the color close to red; higher value of "b" represents the color close to yellow. When the color of the polyester fiber is close to white, the value of "L" is more than 75 and the value of "b" is less than 10. Preferably, the value of "b" is less than 8; more preferably, the value of "b" is less than 4. The detailed measuring results of Examples and Comparative Examples are listed in Table 1.

In the Examples 1 to 6 and Comparative Examples 2 and 3, the steps (a) to (e) in the method for decolorization of the present disclosure are adopted, that is to say, the fresh gas contacts the polyester fiber, turns into the condensate, extracts the dye, and reflows to the ether-alcohol solvent. In the present disclosure, the dye is extracted by the fresh gas vaporized from the ether-alcohol solvent. The method for decolorization of the present disclosure has a lower processing temperature, a lower energy cost, and a better hue than the powder extracting method by xylene and ethylene glycol in the conventional method.

In the Comparative Examples 4 and 5, the dye is extracted by immersing the polyester fiber in the solvent so that the dye in the solvent may re-dye the polyester fiber. For preventing the problem of re-dye, the polyester fiber needs to be immersed in the clean solvent repeatedly to increase the times of extraction so as to increase the removed amount of the dye.

In conclusion, in the method for decolorization of the dyed polyester fiber of the present disclosure, the dye in the polyester fiber is extracted by the fresh gas vaporized from the ether-alcohol solvent. The method can be adopted to remove various dyes, and has a lower processing temperature and a better hue than the conventional method of using

TABLE 1

| | | | Example | | | | | | Comparative Example | | | | |
|---|---|---|---|---|---|---|---|---|---|---|---|---|---|
| | | | 1 | 2 | 3 | 4 | 5 | 6 | 1 | 2 | 3 | 4 | 5 |
| Dye | | | XF-19 | XF-284 | CBN-356 | XF-19 | XF-19 | XF-19 | — | XF-19 | XF-19 | XF-19 | XF-19 |
| Polyester fiber | Color | | Deep yellow | Navy blue | Deep red | Deep yellow | Deep yellow | Deep yellow | White | Deep yellow | Deep yellow | Deep yellow | Deep yellow |
| | Weight(g) | | 1.5 | 1.5 | 1.5 | 1.5 | 1.5 | 1.5 | 1.5 | 1.5 | 1.5 | 1.5 | 1.5 |
| Solvent | Type | | PM | PM | PM | EM | PE | EE | — | Xylene | Ethylene glycol | Xylene | Ethylene glycol |
| | Usage(g) | | 150 | 150 | 150 | 150 | 150 | 150 | 150 | 150 | 150 | 150 | 150 |
| Decolorization | None | | — | — | — | — | — | — | — | — | — | — | — |
| | Present disclosure | | V | V | V | V | V | V | — | V | V | — | — |
| | Solvent immersion | | — | — | — | — | — | — | — | — | — | V | V |
| Processing time (hour) | | | 1 | 1 | 1 | 1 | 1 | 1 | — | 1 | 1 | 1 | 1 |
| Temperature of gas (° C.) | | | 120 | 140 | 197 | 124 | 132.8 | 135.6 | — | 140 | 197 | 140 | 197 |
| Color space | L | Before | 34.6 | 20.6 | 23.6 | 34.6 | 34.6 | 34.6 | 81.3 | 34.6 | 34.6 | 34.6 | 34.6 |
| | | After | 84.7 | 82.3 | 80.4 | 84.3 | 83.5 | 84.1 | — | 83.5 | 80.4 | 71.8 | 72.2 |
| | a | Before | 19.1 | 3.0 | −2.0 | 19.1 | 19.1 | 19.1 | −0.43 | 19.1 | 19.1 | 19.1 | 19.1 |
| | | After | −0.60 | −2.0 | 23.6 | −0.53 | −0.51 | −0.62 | — | 11.2 | −1.8 | 8.3 | 4.2 |
| | b | Before | 11.2 | 18.0 | 6.1 | 11.2 | 11.2 | 11.2 | 1.14 | −0.51 | 11.2 | 11.2 | 11.2 |
| | | After | 1.8 | 1.91 | 2.1 | 1.78 | 2.0 | 1.93 | — | 3.5 | 2.14 | 17.0 | 14.1 | xylene or ethylene glycol as the solvent. Further, the method of the present disclosure can replace the conventional method for decolorization by immersing the polyester fiber in the solvent due to the feasibility of recycling and reusing the ether-alcohol solvent, which can reduce the usage of the solvent.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for decolorization of a dyed polyester fiber, consisting of steps of:
   (a) providing an ether-alcohol solvent and a polyester fiber containing a dye, and the ether-alcohol solvent consisting of propylene glycol monomethyl ether;
   (b) heating the ether-alcohol solvent up to a boiling point of the ether-alcohol solvent to continuingly generate a fresh gas; wherein a temperature of the fresh gas ranges from 90° C. to 200° C. which is between a glass transition temperature of the polyester fiber and a melting point of the polyester fiber;
   (c) extracting the dye from the polyester fiber via the fresh gas and forming an extracting condensate containing the dye;
   (d) reflowing the extracting condensate back into the ether-alcohol solvent; and
   (e) repeating the steps (a) to (d) to obtain a decolorized polyester fiber.

2. The method for decolorization of the dyed polyester fiber according to claim 1, wherein a color space of the decolorized polyester fiber is defined by $L \geq 80$, $a \leq 0$, and $b \leq 4$ according to JIS Z8729 standard.

3. The method for decolorization of the dyed polyester fiber according to claim 1, wherein the boiling point of the ether-alcohol solvent ranges from 100° C. to 140° C.

4. The method for decolorization of the dyed polyester fiber according to claim 1, wherein the dye includes a disperse dye.

5. The method for decolorization of the dyed polyester fiber according to claim 1, wherein the polyester fiber is separately disposed above the ether-alcohol solvent by a distance so that the fresh gas passes through the polyester fiber and condensates onto the polyester fiber.

* * * * *